Feb. 4, 1941.  W. H. MUSSEY  2,230,259
LATERAL MOTION TRUCK ARRANGEMENT
Filed June 20, 1938  4 Sheets-Sheet 3
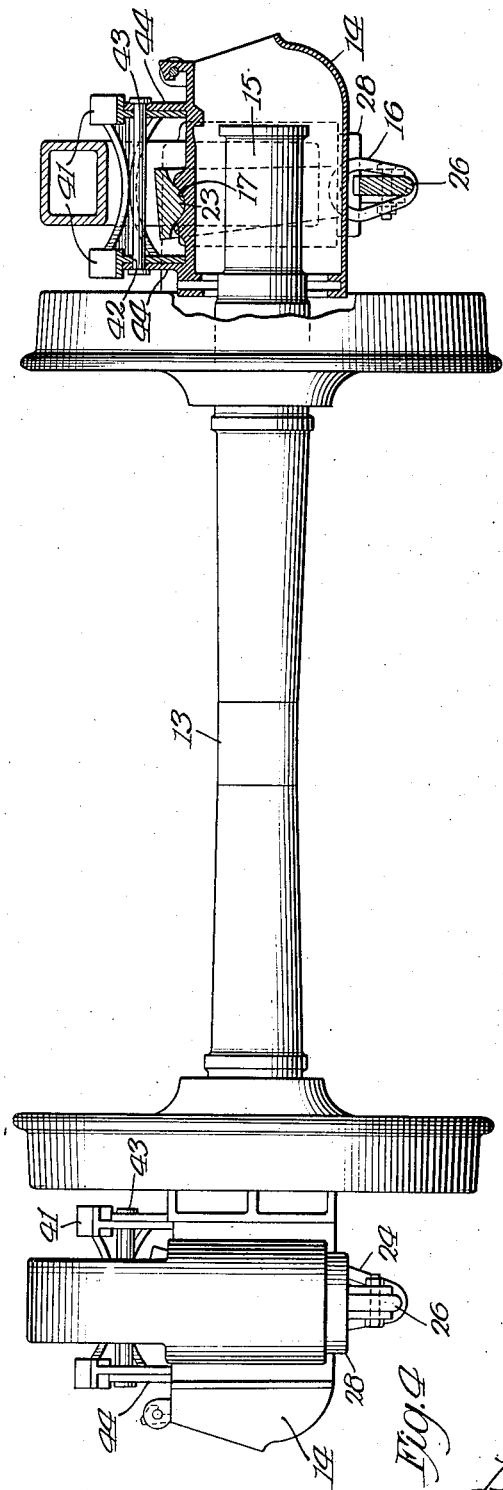
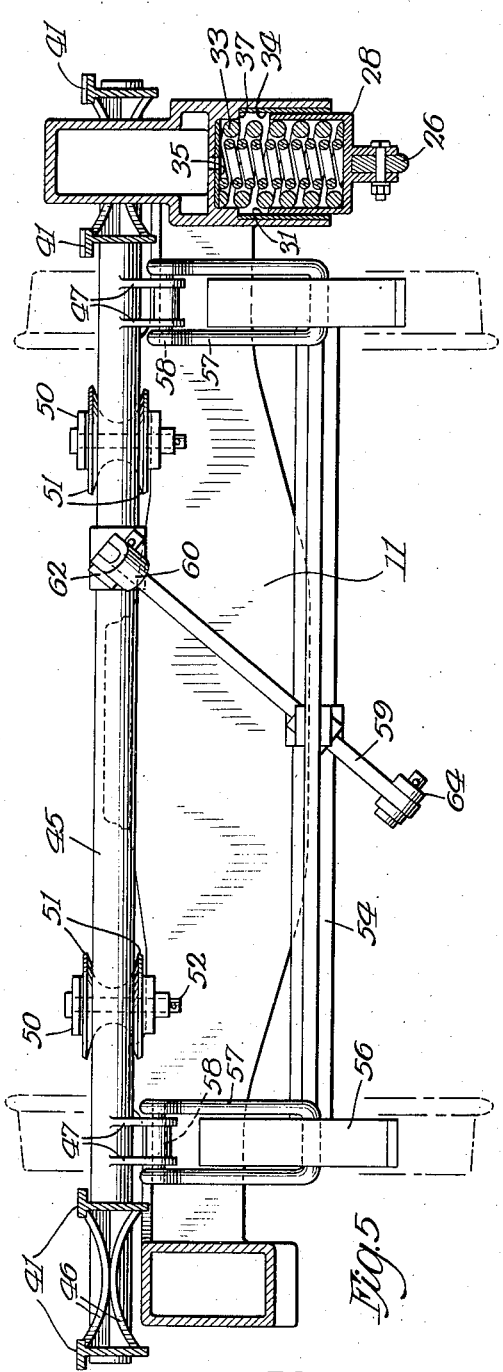
Inventor:
William H. Mussey
By Oscar Hochberg. Atty.

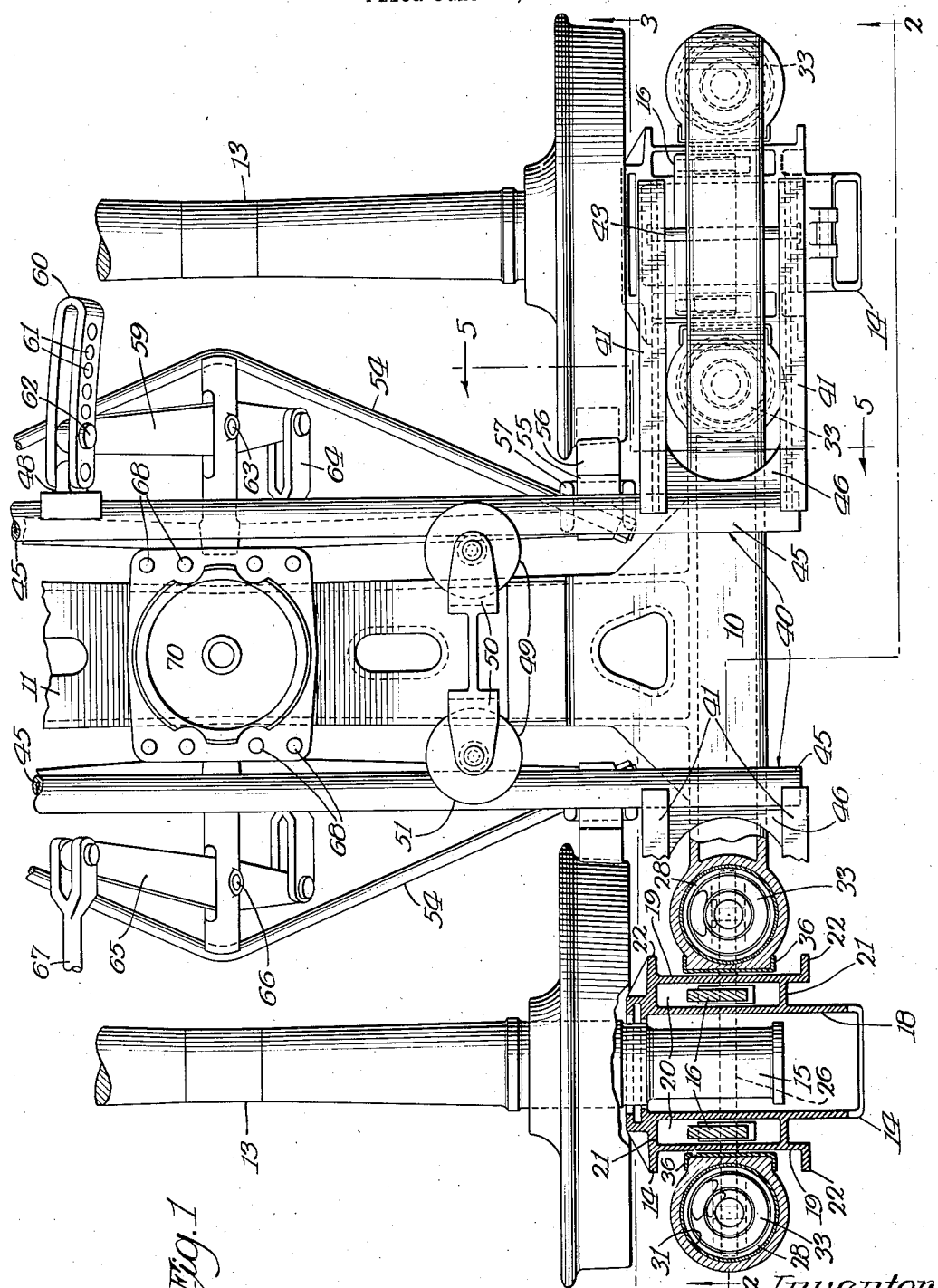

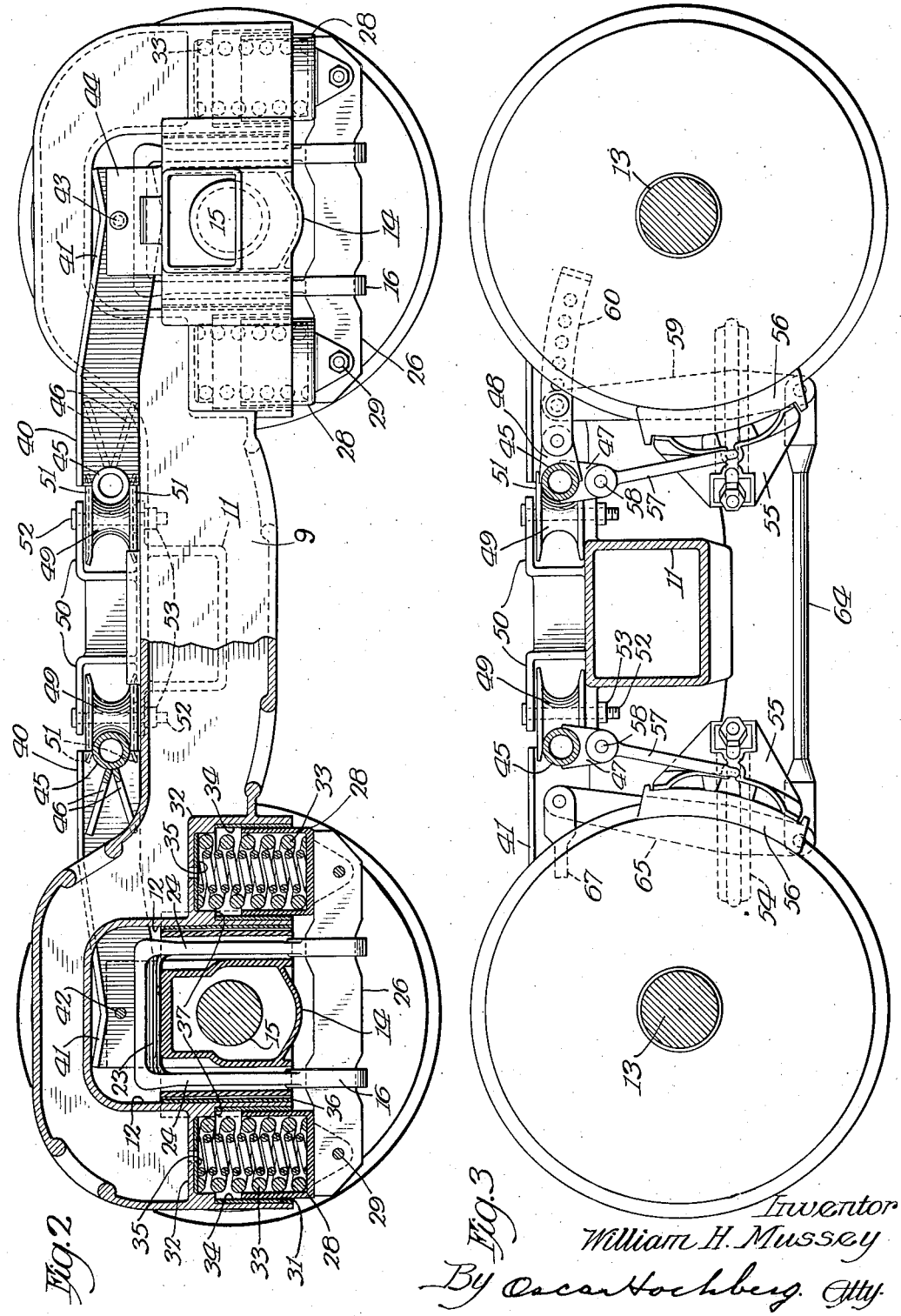

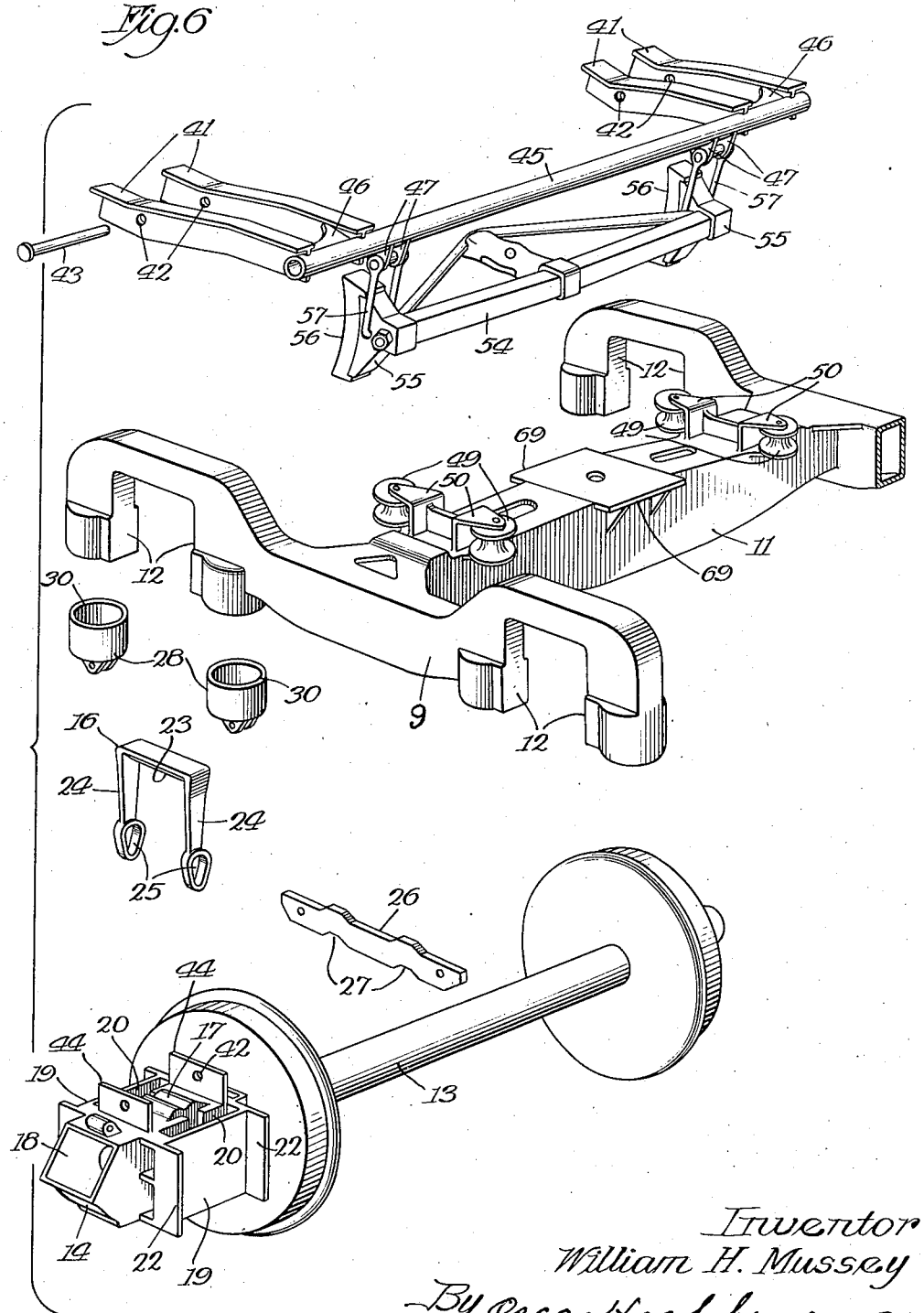

Patented Feb. 4, 1941

2,230,259

UNITED STATES PATENT OFFICE 2,230,259

LATERAL MOTION TRUCK ARRANGEMENT

William H. Mussey, Chicago, Ill., assignor to Pullman-Standard Car Manufacturing Company, Chicago, Ill., a corporation of Delaware Application June 20, 1938, Serial No. 214,673

7 Claims. (Cl. 105—182)

This invention relates to railway car trucks and, more particularly, to trucks of the pivotal type having wheel and axle assemblies laterally movable relative to the truck frame independently of one another, and to the provision of a brake rigging therefor.

The principal object of the invention is the provision of car trucks having axle box mountings affording direct lateral motion of the wheels and axles and brake-supporting structure movable coincidently with the wheels and axles.

Other objects of the invention are the provision of a lateral motion axle box mounting having swing hangers supported on the axle boxes and depending therethrough in shielded relation to the truck pedestals for free and unhampered movement; cushioning means utilizing springs and having interengaging frictional elements affording a snubbing action; brake-supporting structure connected to the axle boxes for movement therewith and having anti-friction support on the truck; and other and more specific improvements hereinafter described.

The foregoing and other objects are obtained by the structure illustrated in the accompanying drawings in which Fig. 1 is a plan view, partly in section, of a truck constructed in accordance with one form of this invention;

Fig. 2 is a side elevation of the truck, partly in section, taken on the line 2—2 of Fig. 1;

Fig. 3 is a sectional view taken on the line 3—3 of Fig. 1 just inside the truck side frame and showing the general details of the brake rigging;

Fig. 4 is an end elevational view of the truck, partly in section, showing the disposition of the swing hanger;

Fig. 5 is a transverse, sectional view taken on the line 5—5 of Fig. 1 and illustrating the brake-supporting arrangement;

Fig. 6 is a general perspective view of all of the truck parts in their relative associated positions for assembly.

In the drawings, 10 represents a car truck frame of any preferred construction but here illustrated as a rigid casting having integral transom 11 and pedestals 12. The truck frame may be of the built-up type if desired, but rigid. An important feature of this invention is the rigidity of the truck frame in combination with the mechanism hereinafter described. By "rigid" is meant a truck frame in which no relative movement occurs between the truck side frames 9 and connecting transom 11. The truck frame is supported on spaced wheel and axle assemblies 13 entered between the respective associated pairs of pedestals. Axle boxes 14 are disposed on the respective journals 15 of each axle and in position to be engaged by the respective pedestals. The axle boxes are constructed with an axle-engaging portion 18 forming the oil cellar, or box proper, and spaced pedestal ways 19 at opposite sides thereof providing through openings 20 extending the full height of the box. The pedestal ways 19 are, of course, integral with the box through the connecting walls 21 closing the openings 20 and are provided with flanges 22 between which the pedestals 12 engage the ways 19 and which limit the lateral swinging of the truck frame by contact with the pedestals. Swing hanger yokes 16 are supported on the journal boxes in bearings 17 which, as shown in Fig. 6, are integral with the boxes but, if desired, may be separate. The swing hangers have a complemental bearing portion 23 seated in the bearings 17 and depending legs 24 extending beneath the level of the bottom of the box through the openings 20, whereby they are free to swing without frictional engagement with either the journal box or pedestals and without interference. The swing hanger yokes at the bottom of the legs 24 have aligned openings 25 of generally inverted ovate shape through which spring seat supporting members 26 are inserted to be carried thereby in interlocked relation therewith.

The spring seat members are offset, as at 27, to provide seats engaging the swing hangers and prevent longitudinal movement of such members. Spring seats 28 are rigidly secured to these members by means of bolts 29 and are provided with vertically extended cylindrical walls 30 which enter complemental guide openings 31 in the respective pedestals. The openings 31 form spring pockets in the pedestals and have spring cap portions 32 which rest upon the multiple coil springs 33 seated in the spring seats 28 at opposite sides of the journal boxes. The side walls of the spring pockets 31 are lined with hardened metal 34 to prevent wear and which may be secured in place by welding. The spring caps also have hardened metal wear plates 35 secured in the same manner. The interengaging relation of the pedestals and spring seats maintains the springs 33, the spring seats 28 and the spring seat supporting members 26 vertical at all times, and this is permitted during the relative lateral swinging of the parts by the inverted ovate shape of the openings 25 in the depending legs 24 of yokes 16, whereby clearance is provided at each side of the spring seat member for such movement. The vertically extending walls 30 of the spring seats frictionally engage the inner side walls of the pockets 31 to modify the cushioning action of springs 33 and provide somewhat of a snubbing action. This action is intensified by the tendency of the spring seats to assume a slight angle with respect to the pedestals due to the relative inclination of the swing hanger yokes 16 and the swinging action, whereby the frictional resistance is greatly increased proportionately to increase the snubbing action. Abutments 37 in the spring pockets 31 are adapted to engage the top edges of vertical walls 30 of the spring seats 28 during deflection of springs 33 to limit compression thereof to avoid compressing the springs solid.

The pedestals 12 are provided with hardened metal wear plates 36 secured thereto by welding and which engage the pedestal ways 19 of the journal boxes during relative lateral swinging and vertical oscillations of the parts. It is to be understood that during the operation of the truck it is the wheel and axle assemblies which move relative to the truck frame in response to deviations in the track, while the frame remains substantially steady. This may readily be permitted due to the absorption of lateral shocks directly at the journal box rather than permitting transmission of such shocks through the truck frame and then absorbing them. The truck is adapted to support a vehicle body by means of center plate 70 and pivot with respect thereto, but for all practical purposes the lateral movement of the wheels and axles afforded by the swing hangers is sufficient to permit negotiation of all curves encountered in main line service without necessity for the truck swiveling. In entering such curves, it is the normal tendency, of course, for the truck frame and vehicle body, as well, to continue in a straight line, and the wheels and axles are moved laterally in opposite directions by contact of the wheel flanges with the rails thereby to permit passage about the curve without disturbing the relative positions of the truck frame and body. Only when the radius of a curve in the track is such as to cause diagonally opposite pedestals 12 to be contacted by outside flanges 22 of diagonally opposite journal boxes 14 in opposing directions will the truck frame be caused to swivel with respect to the vehicle body supported thereon at the center plate 70, and, ordinarily, such curves are encountered only industrially in yards and shops, or the like. The flanges 22 represent the limit of relative lateral movement between the journal boxes and truck frame, and it will be seen that when such limits are reached on a curve, positive forces are set up, due to contact of the wheel flanges with the rails, definitely to cause the truck to swivel about the center plate as a pivot due to the rigidity of the truck frame. The truck frame, due to this rigidity, remains more or less quiescent, while the respective wheel and axle assemblies move about in accord with rail conditions—and especially so in respect to lateral displacement due the use of the swing hangers. The swing hanger yokes 16, as shown, are relatively inclined, but, if conditions so require, they may readily be disposed vertically and parallel since the primary function of these members is to provide for operation of the respective wheel and axle assemblies independently of each other in all movements thereof laterally and, of course, vertically as well.

Brake rigging is provided for cooperation with the wheels and supported from the wheel and axle assemblies and the truck frame for movement coincident with and in response to that of the wheels. The supporting mechanism for the brake rigging comprises generally U-shaped structures 40 disposed in oppositely extending relation and each having bifurcated leg members 41 straddling the truck side frames at the respective pedestal positions and pivotally connected to the respective journal boxes at 42 by means of pins or bolts 43. The journal boxes 14 are each constructed with integral upstanding lugs 44 to which these leg members are pivoted. These lugs are disposed at opposite sides of the swing hanger bearings 17, as best shown in Figs. 4 and 6. The spaced leg members 41 of each U-shaped structure are connected across the truck by means of a tubular cross member 45 to which the leg members are integrally secured by welding and braced by multiple web members 46 also secured between the respective bifurcated legs 41 by welding. Depending lugs 47 are welded to the cross members for supporting the brake rigging and a bracket 48 is secured to one cross member for connection of a dead lever.

By means of the connection 42 to the journal boxes, the U-shaped supporting structures are movable transversely with the wheel and axle assemblies 13, and the cross members 45 are supported on the truck frame for readily permitting lateral movement relative thereto in response to axle movement. In this manner the brake rigging is suspended in position properly to engage the wheels at all times. The cross members 45 are supported from the truck frame by anti-friction rollers 49 mounted in brackets 50 on the transom 11 at each side of the truck for each cross member. The brackets 50 are illustrated as integral with the truck frame, but may be built-up if desired. The rollers 49 are disposed in the brackets 50 with their axes preferably vertical, whereby flanges 51 confine the cross members 45 against the vertical reaction of the brake rigging when the brakes are applied. Bolts 52, secured in the brackets 50 by nuts 53, provide axles about which the rollers 49 rotate.

The brake rigging comprises a pair of brake beams 54 of usual construction, each having heads 55 secured to the opposite ends thereof with brake shoes 56 for engaging the respective wheels. The brake beams are suspended from the respective cross members 45 by means of hangers 57 taking the brake heads 55 and pivotally secured to the lugs 47 by pins 58, whereby the beams are positively moved with the brake-supporting structure and thereby with the wheels. A dead lever 59 is connected at its upper end with the bracket 48 on one of the cross members 45 by means of a link 60 providing a plurality of manual adjustments for wear through the various openings 61 for the anchoring pin 62. Intermediate its ends, the dead lever is operatively connected at 63 to one of the brake beams and, at its lower end, by means of a bottom connection 64, is connected with a live brake lever 65 which is connected intermediate its ends, as at 66, to the other brake beam. The live lever 65 is connected at its upper end with a pull rod 67 which is operatively associated with brake operating mechanism (not shown) mounted either on the truck or a vehicle body and by means of which the brakes function. A vehicle body may be pivotally associated with the truck by means of a supporting center plate 70 secured to flanges 69 of the transom 11 by means of rivets 68, and the combination of this pivotal association of the truck and car body with the lateral motion of the respective wheel and axle assemblies independently of one another, as afforded by the journal box swing hangers, provides an easy riding motion in negotiating curves and irregularities in the track and tends to smooth out roughness of the track and roadbed without transmitting excessive motion through the truck to the body.

From the foregoing it will be seen that there has been provided a vehicle truck simple in construction and efficient in operation, taking care of necessary lateral motion in the most direct manner and affording independent action of the respective wheel and axle assemblies laterally in combination with a truck pivotally associated with a vehicle body, whereby an easy riding quality is given the truck not otherwise attainable.

What is claimed is:

1. A pivotal truck including a rigid truck frame, wheeled axle assemblies including journal boxes movable laterally independently of one another with respect to said truck frame, pedestals on said truck frame embracing said boxes, means extending through, enclosed by and supported on said boxes for supporting said truck frame, interlocking members supported on said means, spring seats on said members frictionally engaging said pedestals, and supporting springs between said seats and pedestals and enclosed thereby.

2. A vehicle truck including a truck frame having pedestals, wheeled axles having journal boxes disposed between said pedestals and movable laterally with respect to said truck frame independently of each other, said journal boxes each having an axle-engaging portion and pedestal-engaging portions in spaced relation to the opposite sides of said axle engaging portions, yokes supported on top of the axle-engaging portions of said journal boxes and extending beneath the boxes through the openings at opposite sides thereof afforded by the spaced pedestal portions, spring seats carried by said yokes and frictionally engaging said pedestals, and springs interposed between said spring seats and pedestals, said springs being completely enclosed by said spring seats and pedestals.

3. A vehicle truck including a truck frame having pedestals, wheeled axles having journal boxes disposed between said pedestals and movable laterally with respect to said truck frame independently of each other, said journal boxes each having an axle-engaging portion and pedestal-engaging portions in spaced relation to the opposite sides of said axle-engaging portions, yokes supported on top of the axle-engaging portions of said journal boxes and extending beneath the boxes through the openings at opposite sides thereof afforded by the spaced pedestal portions, spring seats carried by said yokes and frictionally engaging said pedestals, springs interposed between said spring seats and pedestals, said springs being completely enclosed by said spring seats and pedestals, and means to limit deflection of said springs.

4. A vehicle truck including a truck frame having pedestals, wheeled axles having journal boxes disposed between said pedestals and movable laterally with respect to said truck frame independently of each other, said journal boxes each having an axle-engaging portion and pedestal-engaging portions in spaced relation to the opposite sides of said axle-engaging portions, yokes supported on top of the axle-engaging portions of said journal boxes and extending beneath the boxes through the openings at opposite sides thereof afforded by the spaced pedestal portions, spring seats carried by said yokes and frictionally engaging said pedestals, springs interposed between said spring seats and pedestals, said springs being completely enclosed by said spring seats and pedestals, and abutments on said pedestals engaging said spring seats to limit deflection of said springs.

5. A vehicle truck including a truck frame having pedestals, wheeled axles having journal boxes disposed between said pedestals and movable laterally with respect to said truck frame independently of each other, said journal boxes each having an axle-engaging portion and pedestal engaging-portions in spaced relation to the opposite sides of said axle-engaging portions, yokes supported on top of the axle-engaging portions of said journal boxes and extending beneath the boxes through the openings at opposite sides thereof afforded by the spaced pedestal portions, spring seats carried by said yokes entering and guided within said pedestals for vertical movement, supporting springs interposed between said spring seats and pedestals, said springs being completely enclosed by said spring seats and pedestals, and abutments in said pedestals engaging said spring seats to limit deflection of said springs.

6. A vehicle truck including a truck frame having pedestals, wheeled axles having journal boxes disposed between said pedestals and movable laterally with respect to said truck frame independently of each other, said journal boxes each having an axle-engaging portion and pedestal-engaging portions in spaced relation to the opposite sides of said axle-engaging portions, bearings provided on top of said axle-engaging portions, swing hangers supported on said bearings and extending beneath said journal boxes through the openings afforded by said spaced pedestal portions, spring supporting members on said swing hangers, and springs on said members supporting said truck frame and enclosed by said members and pedestals.

7. A vehicle truck including a truck frame having pedestals, wheeled axles having journal boxes disposed between said pedestals and movable laterally with respect to said truck frame independently of each other, said journal boxes each having an axle-engaging portion and pedestal-engaging portions in spaced relation to the opposite sides of said axle-engaging portions, bearings provided on top of said axle-engaging portions, swing hangers supported on said bearings and extending beneath said journal boxes through the openings afforded by said spaced pedestal portions, spring seat supporting members carried by said swing hangers, spring seats secured to said members and maintained therewith in vertical alignment with said pedestals by telescopic engagement therewith, and springs on said seats entering said pedestals to said support said truck frame, said springs being completely enclosed by said spring seats and pedestals.

WILLIAM H. MUSSEY.

CERTIFICATE OF CORRECTION.

Patent No. 2,230,259. February 4, 1941.

WILLIAM H. MUSSEY.

It is hereby certified that error appears in the printed specification of the above numbered patent requiring correction as follows: Page 2, first column, line 66, after the word "due" insert --to--; page 3, second column, line 70, claim 7, for "said support" read --support--; and that the said Letters Patent should be read with this correction therein that the same may conform to the record of the case in the Patent Office.

Signed and sealed this 22nd day of April, A. D. 1941.

(Seal)

Henry Van Arsdale,
Acting Commissioner of Patents.